(12) United States Patent
Sorimachi

(10) Patent No.: US 11,218,240 B2
(45) Date of Patent: Jan. 4, 2022

(54) CODE GENERATION APPARATUS, CODE GENERATION METHOD, AND COMPUTER READABLE MEDIUM

(71) Applicant: MITSUBISHI ELECTRIC CORPORATION, Tokyo (JP)

(72) Inventor: Toru Sorimachi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 82 days.

(21) Appl. No.: 16/610,156

(22) PCT Filed: Jun. 27, 2017

(86) PCT No.: PCT/JP2017/023646
§ 371 (c)(1),
(2) Date: Nov. 1, 2019

(87) PCT Pub. No.: WO2019/003321
PCT Pub. Date: Jan. 3, 2019

(65) Prior Publication Data
US 2021/0203430 A1 Jul. 1, 2021

(51) Int. Cl.
*H04J 13/10* (2011.01)
*H04B 1/707* (2011.01)
(Continued)

(52) U.S. Cl.
CPC .............. *H04J 13/10* (2013.01); *H04B 1/707* (2013.01); *H04L 9/0637* (2013.01); *H04L 9/085* (2013.01)

(58) Field of Classification Search
CPC . H04L 27/26; H04L 27/2613; H04L 27/0012; H04L 5/0055; H04L 67/104; H04J 13/0014; H04B 15/02
See application file for complete search history.

(56) References Cited

U.S. PATENT DOCUMENTS 6,473,448 B1 10/2002 Shono et al.
RE40,709 E 5/2009 Akahane et al.
(Continued)

FOREIGN PATENT DOCUMENTS

EP 1 998 488 A1 12/2008
JP 9-186630 A 7/1997
(Continued)

OTHER PUBLICATIONS

Extended European Search Report dated May 4, 2020 in corresponding European Application No. 17 915 496.8.
(Continued)

*Primary Examiner* — Iqbal Zaidi
(74) *Attorney, Agent, or Firm* — Birch, Stewart, Kolasch & Birch, LLP

(57) ABSTRACT

A code generation apparatus (100) generates a plurality of spreading code sequences, using block encryption processing of outputting a plurality of blocks as a spreading code sequence (D). A parameter selection unit (130) acquires a sequence parameter (KP) uniquely corresponding to each spreading code sequence (D) of the of the plurality of spreading code sequences. A secret key acquisition unit (150) acquires a secret key (K). A code sequence generation unit (140) changes output data that is output from each of process elements, using the sequence parameter (KP), when the code sequence generation unit (140) generates each spreading code sequence (D) of the plurality of spreading code sequences by the block encryption processing using the sequence parameter (KP) and the secret key (K).

10 Claims, 13 Drawing Sheets

(51) Int. Cl.
*H04L 9/06* (2006.01)
*H04L 9/08* (2006.01)

(56) References Cited

U.S. PATENT DOCUMENTS

| | | |
|---|---|---|
| 2002/0041623 A1 | 4/2002 | Umeno |
| 2002/0171410 A1 | 11/2002 | Akahane et al. |
| 2003/0002663 A1 | 1/2003 | Kurdziel |
| 2004/0146095 A1 | 7/2004 | Umeno et al. |
| 2007/0098054 A1 | 5/2007 | Umeno |
| 2010/0054225 A1 | 3/2010 | Hadef et al. |
| 2012/0033804 A1 | 2/2012 | Soquet |
| 2015/0127733 A1* | 5/2015 | Ding .................... H04W 8/005 709/204 |
| 2016/0226585 A1* | 8/2016 | Sibecas ................ H04B 10/116 |
| 2017/0094527 A1* | 3/2017 | Shattil ...................... H04K 3/44 |
| 2017/0366339 A1 | 12/2017 | Noura et al. |

FOREIGN PATENT DOCUMENTS

| | | |
|---|---|---|
| JP | 11-266179 A | 9/1999 |
| JP | 2000-252751 A | 9/2000 |
| JP | 2001-292129 A | 10/2001 |
| JP | 2002-290274 A | 10/2002 |
| JP | 2007-96815 A | 4/2007 |
| JP | 2010-511336 A | 4/2010 |
| WO | WO 2016/087520 A1 | 6/2016 |

OTHER PUBLICATIONS

Internaitional Search Report, issued in PCT/JP2017/023646, dated Sep. 26, 2017.

Matsui Mitsuru, et al. "New Structure of Block Ciphers with Provable Security Against Differential and Linear Cryptanalysis", Feb. 21, 1996, Big Data Analytics in the Social and Ubiquitous Context: 5th interntional Workshop on Modeling Social Media, pp. 205-218.

Office Action dated Dec. 17, 2020 in corresponding European Application No. 17 915 496.8.

Communication pursuant to Article 94(3) EPC dated May 28, 2021 in corresponding European Application No. 17 915 496.8.

Hamdoun et al. "Implementation of Stronger AES by Using Dynamic S-Box Dependent of Master Key"; Journal of Theoretical and Applied Information Technology, Jul. 20, 2013, pp. 196-204, XP055806674, Retrieved from the internet on May 21, 2021; URL:http://www.jatit.org/volumes/Vol53No2/6Vol53No2.pdf.

* cited by examiner

CODE GENERATION APPARATUS, CODE GENERATION METHOD, AND COMPUTER READABLE MEDIUM

TECHNICAL FIELD

The present invention relates to a code generation apparatus, a code generation method, and a code generation program to generate a plurality of spreading code sequences that are highly confidential.

BACKGROUND ART

In recent years, various services using satellite communication or wireless communication have been provided. A spread spectrum system is used in these services in order to implement connectivity and confidentiality of the communication. There are a direct sequence spread spectrum system and a frequency hopping system in the spread spectrum system. In the direct sequence spread spectrum system, data communication is performed by spreading energy to frequencies wider than that of transmission data. In the frequency hopping system, communication is performed between a transmitting apparatus and a receiving apparatus by switching a frequency to a higher one according to a certain rule.

In the direct sequence spread spectrum system, a signal desired to be transmitted is spread to a wide band, using spreading code sequences. This causes the signal desired to be transmitted to have a characteristic of appearing like noise in the direct sequence spread spectrum system. This characteristic makes it difficult for the signal desired to be transmitted to be intercepted, thereby increasing jamming resistance. This makes it difficult for interference to a narrow band signal to occur in the direct sequence spread spectrum system. As mentioned above, the spreading code sequences in the direct sequence spread spectrum system are important for implementing reliable and secure transmission without causing high interference with a different signal.

In the direct sequence spread spectrum system that has been commonly used, use of each spreading code sequence having a short periodicity increases connectivity of communication. However, it becomes highly likely that the spreading code sequence having the short periodicity will be inferred by being observed for a certain period of time, so that confidentiality is low. However, it is necessary to increase the confidentiality in order to increase resistance against radio interference. Therefore, a method of lengthening the period of the spreading code sequence is used. Alternatively, a method of adopting spreading code sequences using confidential information that cannot be predicted by a third party is used. Patent Literature 1 discloses a method of using a chaotic sequence as a technology for enhancing confidentiality of a spreading code sequence.

Patent Literature 1 discloses a method of generating chaotic spreading codes that are suitable for a satellite navigation system and a CDMA (Code Division Multiple Access) communication system. Patent Literature 1 discloses that the spreading codes generated by using the chaotic sequence have autocorrelation and cross-correlation properties and improve confidentiality. The confidentiality that is achieved by the spreading codes generated by using the chaotic sequence indicates randomness including pseudo randomness. The confidentiality that is achieved by the spreading codes generated by using the chaotic sequence, however, does not indicate strict security which is given when a cryptographic technology is used. Further, in order to perform spread spectrum communication that is highly confidential by using the spreading codes generated by using the chaotic sequence, establishment of chaotic sequence synchronization is necessary. Patent Literature 1, however, does not disclose an effective method for the establishment of the synchronization.

Each of prior arts from Patent Literatures 2 to 7 discloses a method of achieving confidentiality improvement by using a chaotic sequence. Each of the prior arts from Patent Literatures 2 to 7, however does not disclose an effective method for establishment of chaotic sequence synchronization.

As an effective method for establishment of chaotic sequence synchronization, a method of using a CTR (Counter) mode of an n-bit block encryption algorithm may be considered.

CITATION LIST

Patent Literature

Patent Literature 1: JP 2010-511336 A
Patent Literature 2: JP 1997-186630 A
Patent Literature 3: JP 1999-266179 A
Patent Literature 4: JP 2000-252751 A
Patent Literature 5: JP 2001-292129 A
Patent Literature 6: JP 2002-290274 A
Patent Literature 7: JP 2007-96815 A

SUMMARY OF INVENTION

Technical Problem

Conventionally, there has been proposed a code generation method using a chaotic sequence or a feedback shift register with a long size. In a communication system using the conventional code generation method, enhancement of confidentiality of a spreading code sequence or increase of the period of the spreading code sequence is performed. This makes it impossible to search entire codes, so that establishment of synchronization becomes difficult. Then, a communication system using a spreading code sequence for actual data communication and a pilot sequence for the synchronization is proposed.

However, since signal transmission is performed by dividing one communication band into two communication bands in this communication system, communication efficiency is reduced. Further, when the pilot sequence is used, a dedicated operation function and a derivation period for deriving the spreading code sequence after an elapse of a certain period of time are needed at a receiving side of the communication system.

In a communication system that relays a plurality of satellites, it is necessary for a relay satellite that relays communication to simultaneously generate a plurality of spreading code sequences according to the number of the satellites that are communication parties and the number of control stations on the ground. In the conventional method of generating the codes that are highly confidential, the chaotic sequence, the feedback shift register with the long size, or a nonlinear transformation function that is different for each spreading code sequence becomes necessary, so that a generation apparatus is needed for each spreading code sequence. Thus, there is a problem that when the generation apparatus is mounted on the satellite, a mounting scale is greatly constrained.

An object of the present invention is to provide a code generation apparatus to generate a plurality of spreading code sequences that are highly confidential by changing a part of a configuration of a block encryption algorithm.

Solution to Problem

A code generation apparatus according to the present invention is a code generation apparatus to generate a plurality of spreading code sequences using block encryption processing to output a plurality of blocks as a spreading code sequence, the block encryption processing including process elements each to receive input data and to output output data. The code generation apparatus may include:
a parameter selection unit to select a sequence parameter uniquely corresponding to each spreading code sequence of the plurality of spreading code sequences;
a secret key acquisition unit to acquire a secret key; and
a code sequence generation unit to generate each spreading code sequence of the plurality of spreading code sequences by execution of the block encryption processing using the sequence parameter and the secret key, the code sequence generation unit changing the output data that is output from each of the process elements, using the sequence parameter, when the code sequence generation unit generates each spreading code sequence.

Advantageous Effects of Invention

The code generation apparatus according to the present invention generates the plurality of spreading code sequences using the block encryption processing to output the plurality of blocks as the spreading code sequence. The parameter selection unit selects the sequence parameter uniquely corresponding to each spreading code sequence of the plurality of spreading code sequences. The secret key acquisition unit acquires the secret key. The code sequence generation unit generates each spreading code sequence of the plurality of spreading code sequences by execution of the block encryption processing using the sequence parameter and the secret key. The code sequence generation unit changes the output data that is output from each of the process elements, using the sequence parameter, when the code sequence generation unit generates each spreading code sequence. As mentioned above, according to the code generation apparatus of the present invention, by changing a part of each processing element in the block encryption processing using the sequence parameter uniquely corresponding to each spreading code sequence, the plurality of spreading code sequences can be generated. Thus, according to the code sequence generation apparatus of the present invention, an effect capable of generating the plurality of spreading code sequences that are highly confidential is attained.

DESCRIPTION OF EMBODIMENTS

Figure 1:
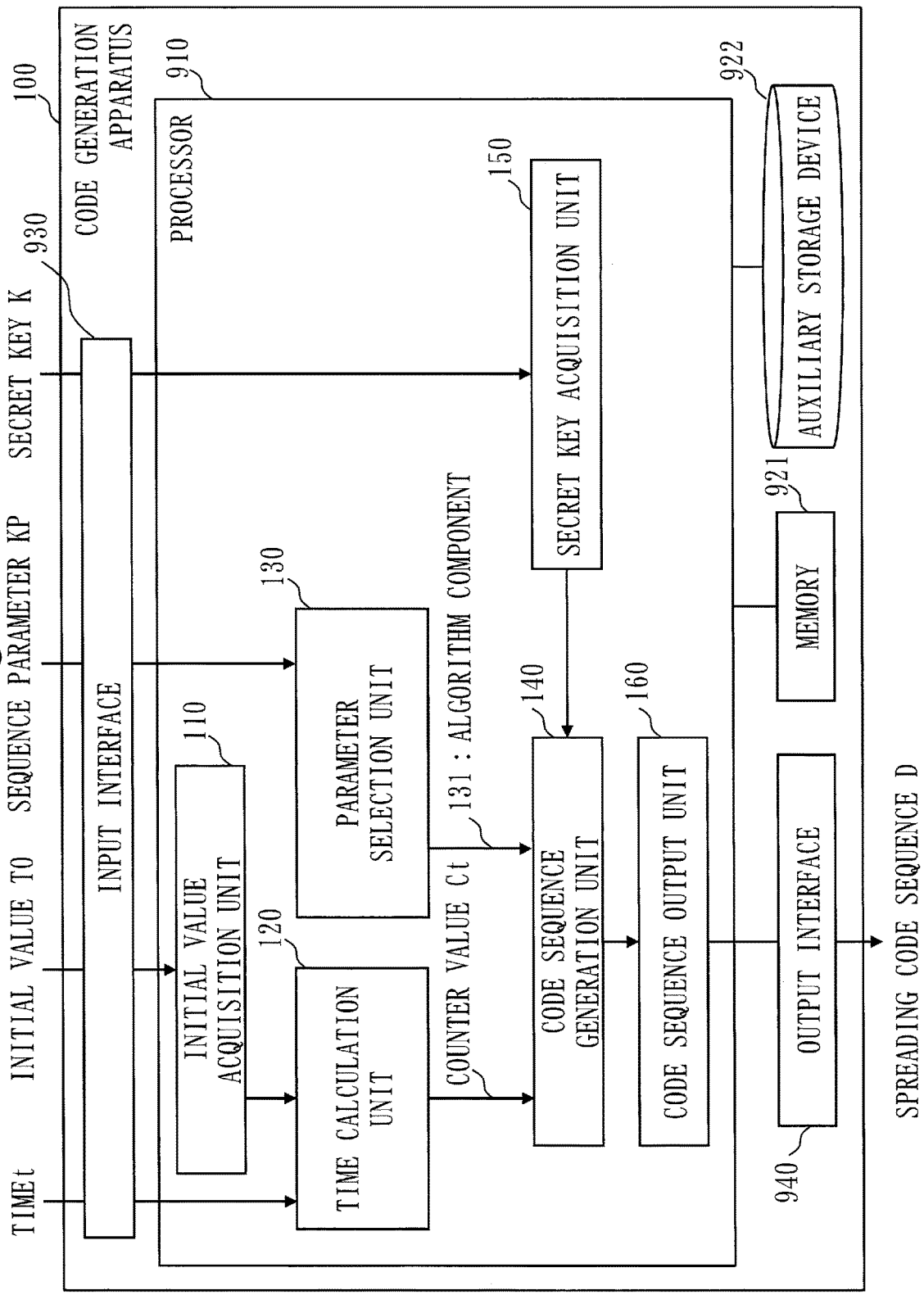
FIG. 1 is a configuration diagram of a code generation apparatus 100 according to a first embodiment.

Hereinafter, embodiments of the present invention will be described, using the drawings. The same reference numeral is given to the same or equivalent portions in the respective drawings. In the description of the embodiments, a description of the same or equivalent portions will be suitably omitted or simplified.

First Embodiment

Description of Configuration
A configuration of a code generation apparatus 100 according to this embodiment will be described, using FIG. 1.
The code generation apparatus 100 according to this embodiment implements a spreading code system capable of generating a plurality of spreading code sequences that are highly confidential. By using block encryption processing to output a plurality of blocks as a spreading code sequence, the code generation apparatus 100 generates the plurality of spreading code sequences. The block encryption processing includes a plurality of process elements. Hereinafter, the block encryption processing will also be referred to as a block encryption algorithm. Further, the process elements of the block encryption processing will also be referred to as internal configuration elements of the block encryption algorithm.
The code generation apparatus 100 is a computer. The code generation apparatus 100 includes a processor 910 and includes other hardware such as a memory 921, an auxiliary storage device 922, an input interface 930, and an output interface 940. The processor 910 is connected to the other hardware through signal lines and controls these other hardware.

The code generation apparatus 100 includes an initial value acquisition unit 110, a time calculation unit 120, a parameter selection unit 130, a code sequence generation unit 140, a secret key acquisition unit 150, and a code sequence output unit 160, as functional elements. Functions of the initial value acquisition unit 110, the time calculation unit 120, the parameter selection unit 130, the code sequence generation unit 140, the secret key acquisition unit 150, and the code sequence output unit 160 are implemented by software.

The processor 910 is a device to execute a code generation program. The code generation program is a program to implement the functions of the initial value acquisition unit 110, the time calculation unit 120, the parameter selection unit 130, the code sequence generation unit 140, the secret key acquisition unit 150, and the code sequence output unit 160.

The processor 910 is an IC (Integrated Circuit) to perform operation processing. A specific example of the processor 910 is a CPU (Central Processing Unit), a DSP (Digital Signal Processor), or a GPU (Graphics Processing Unit).

The memory 921 is a storage device to temporarily store data. A specific example of the memory 921 is an SRAM (Static Random Access Memory) or a DRAM (Dynamic Random Access Memory).

The auxiliary storage device 922 is a storage device to hold data. A specific example of the auxiliary storage device 922 is an HDD (Hard Disk Drive). The auxiliary storage device 922 may be a portable storage medium such as an SD (registered trademark) (Secure Digital) memory card, a CF (CompactFlash), a NAND flash, a flexible disk, an optical disk, a compact disk, a blue ray (registered trademark) disk, or a DVD (Digital Versatile Disk).

The input interface 930 is a port that is connected to an input device such as a mouse, a keyboard, or a touch panel. Specifically, the input interface 930 is a USB terminal (Universal Serial Bus) terminal. The input interface 930 may be a port that is connected to a LAN (Local Area Network).

The output interface 940 is a port to which a cable of a display apparatus such as a display is connected. Specifically, the output interface 940 is a USB terminal or an HDMI (registered trademark) (High Definition Multimedia Interface) terminal. Specifically, the display is an LCD (Liquid Crystal Display).

The code generation program is loaded into the processor 910 and is then executed by the processor 910. An OS as well as the code generation program is stored in the memory 921. The processor 910 executes the code generation program while executing the OS. The code generation program and the OS may be stored in the auxiliary storage device 922. The code generation program and the OS that are stored in the auxiliary storage device 922 are loaded into the memory 921 and are then executed by the processor 910. A part or all of the code generation program may be incorporated into the OS.

The code generation apparatus 100 may include a plurality of processors that replace the processor 910. These plurality of processors share execution of the code generation program. Each processor is a device to execute the code generation program, like the processor 910.

Data, information, signal values, and variable values that are used, processed, or output by the code generation program are stored in the memory 921, the auxiliary storage device 922, or a register or a cache memory in the processor 910.

The code generation program is a program to cause the computer to execute processes, procedures, or steps where "units" of the initial value acquisition unit 110, the time calculation unit 120, the parameter selection unit 130, the code sequence generation unit 140, the secret key acquisition unit 150, and the code sequence output unit 160 are read as the "processes", "procedures", or "steps". A code generation method is a method to be performed by execution of the code generation program by the code generation apparatus 100 that is the computer.

The code generation program may be recorded in a computer-readable storage medium and then may be provided or may be provided as a program product.

Description of Operations

Subsequently, operations of the respective units of the code generation apparatus 100 according to this embodiment will be described.

Figure 2:
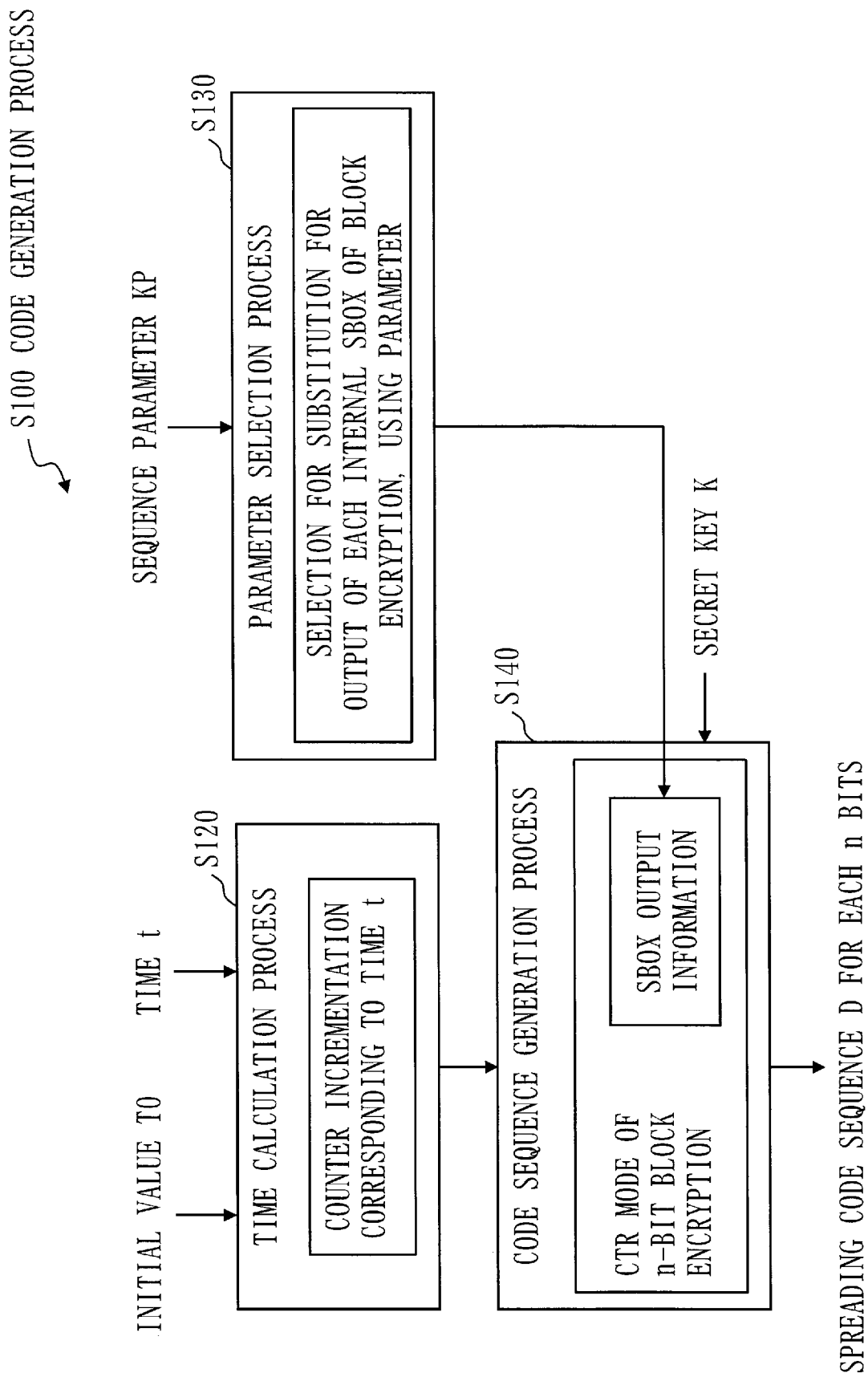
FIG. 2 is a flow diagram illustrating a code generation process S100 of the code generation apparatus 100 according to the first embodiment.

FIG. 2 is a diagram illustrating a code generation process S100 of the code generation apparatus 100 according to this embodiment.

The code generation process S100 of the code generation apparatus 100 according to this embodiment will be described, using FIGS. 1 and 2.

The code generation process S100 includes a time calculation process S120 by the time calculation unit 120, a parameter selection process S130 by the parameter selection unit 130, and a code sequence generation process S140 by the code sequence generation unit 140.

The initial value acquisition unit 110 acquires an initial value T0 via the input interface 930. The initial value acquisition unit 110 outputs, to the time calculation unit 120, the initial value T0 acquired. The initial value T0 is the initial value of a counter value that is used in the CTR mode of the block encryption processing.

<Time Calculation Process S120>

The time calculation unit 120 counts up the counter value that is used in the CTR mode and outputs a counter value Ct to the code sequence generation unit 140 for each threshold time t. The time calculation unit 120 receives the initial value T0 from the initial value acquisition unit 110. The time calculation unit 120 acquires the threshold time t that is an interval for spreading code generation. The time calculation unit 120 calculates the initial value T0 after the time t as the counter value Ct, and outputs the counter value Ct to the code sequence generation unit 140. Thereafter, the time calculation unit 120 counts up the counter value, and outputs the counter value Ct to the code sequence generation unit 140 for each time t. The time calculation unit 120 is also referred to as an after time-t initial value calculation unit.

Figure 3:
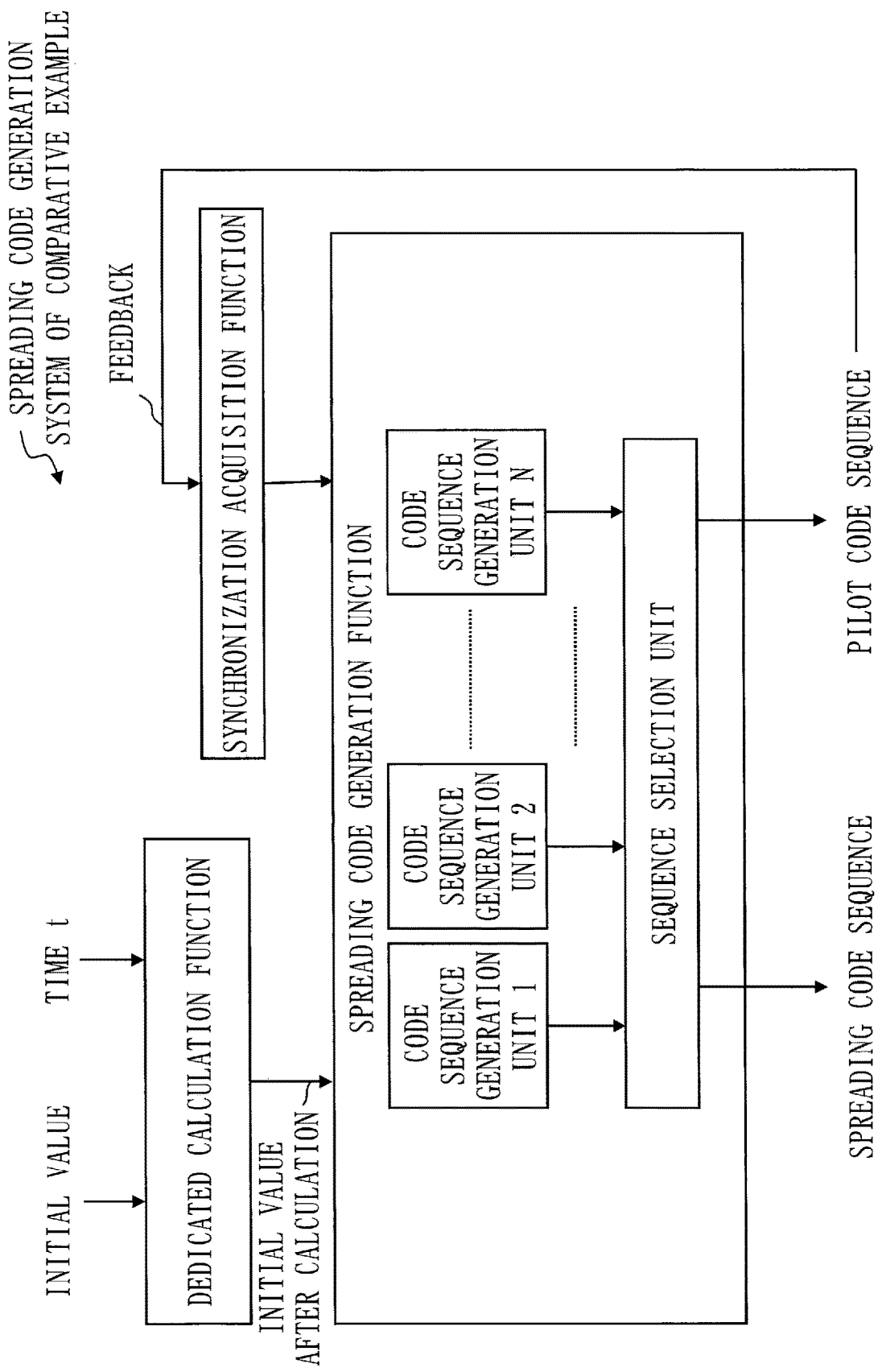
FIG. 3 is a diagram illustrating a spreading code generation system of a comparative example to be compared with the code generation apparatus 100 according to the first embodiment.

FIG. 3 is a diagram illustrating a spreading code generation system of a comparative example. As illustrated in FIG. 3, the spreading code generation system of the comparative example includes a dedicated calculation function of generating an initial value after a time t. The spreading code generation system of the comparative example includes a synchronization acquisition function for acquiring synchronization. The code generation system of the comparative example includes a plurality of code sequence generation units each including an algorithm that is different for each spreading code sequence to be generated.

In the time calculation process S120, the time calculation unit 120 derives the counter value Ct after the time t. Specifically, the time calculation unit 120 performs counter incrementation corresponding to the time t, thereby deriving the counter value Ct after the time t. Accordingly, it is not necessary to use the dedicated calculation function as illustrated in FIG. 3. Further, if an accurate time transition is synchronized as mentioned above, each spreading code sequence can be derived from a counter value obtained by counting up corresponding to the time transition. Accordingly, it is not necessary to use the synchronization acquisition function for acquiring the synchronization.

<Parameter Selection Process S130>

In the parameter selection process S130, the parameter selection unit 130 selects a sequence parameter KP that uniquely corresponds to each spreading code sequence of the plurality of spreading code sequences. Specifically, the parameter selection unit 130 acquires the sequence parameter KP via the input interface 930. The parameter selection unit 130 selects or generates an algorithm component 131, based on the sequence parameter KP. The algorithm component 131 is used for generating the spreading code sequence corresponding to the sequence parameter KP. The parameter selection unit 130 outputs the algorithm component 131 to the code sequence generation unit 140.

The algorithm component 131 is information that has been obtained from the sequence parameter KP that uniquely corresponds to the spreading code sequence. Specifically, the algorithm component 131 is used for changing output data that is to be output from each process element of the block encryption algorithm which is used in the code sequence generation process S140. Herein, the block encryption algorithm includes a substitution process to perform, for each bit, substitution for input data that has been input, as each process element, based on a substitution table. A specific example of the substitution process is an SBOX.

The parameter selection unit 130 selects or generates an output parameter Op, based on the sequence parameter KP that has been received. The output parameter Op is used for changing a plurality of bits of the output data to be output from each SBOX. Then, the parameter selection unit 130 outputs the output parameter Op to the code sequence generation unit 140 as the algorithm component 131.

If the block encryption algorithm holds provable security, security to be assessed by the differential characteristic probability against differential cryptanalysis or security to be assessed by the linear characteristic probability against linear cryptanalysis will not be reduced even if the output data to be output from each SBOX has been changed based on the sequence parameter KP. As a specific example of the block encryption algorithm that holds the provable security, MISTY (registered trademark) may be pointed out. By adopting MISTY as the block encryption algorithm, the output data of each SBOX can be changed without reducing the security to be assessed by the differential characteristic probability against the differential cryptanalysis or the security to be assessed by the linear characteristic probability against the linear cryptanalysis.

The secret key acquisition unit 150 acquires a secret key K via the input interface 930. The secret key acquisition unit 150 outputs, to the code sequence generation unit 140, the secret key K acquired.

<Code Sequence Generation Process S140>

In the code sequence generation process S140, the code sequence generation unit 140 generates each spreading code sequence of the plurality of spreading code sequences, by the block encryption algorithm using the sequence parameter KP and the secret key K. When the code sequence generation unit 140 generates the spreading code sequence, the code sequence generation unit 140 changes the output data that is output from each process element, using the sequence parameter KP.

Specifically, the code sequence generation unit 140 receives, from the time calculation unit 120, the counter value Ct after the time t, and receives, from the secret key acquisition unit 150, the secret key K. The code sequence generation unit 140 receives, from the parameter selection unit 130, the sequence parameter KP, as the algorithm component 131. The code sequence generation unit 140 generates the spreading code sequence, based on the counter value Ct after the time t, the secret key K, and the sequence parameter KP. The code sequence generation unit 140 outputs, to the code sequence output unit 160, the spreading code sequence generated. The code sequence generation unit 140 generates blocks that are output by execution of the block encryption algorithm in the CTR mode, as the spreading code sequence.

Specifically, the code sequence generation unit 140 generates the spreading code sequence for each n bits, using the CTR mode of the n-bit block encryption algorithm.

In a block encryption system using the CTR mode, an initial value is input to a counter (hereinafter written as a CTR) of a block encryption algorithm, and confidential information is input to a secret key. Then, the block encryption system using the CTR mode generates an n-bit random data sequence. Then, in the block encryption system using the CTR mode, the CTR is incremented by one bit, and the CTR is input to the block encryption algorithm. Then, the block encryption system using the CTR mode generates a subsequent different random data sequence for n bits. In the case of an n-bit block encryption, n-bit random data corresponding to increments of $2^n$ rounds can be generated. Accordingly, the random data for n bits×$2^n$ rounds can be used as spreading code sequences. As common block encryption algorithms, MISTY (registered trademark) and KASUMI for a block size of 64 bits, or AES and Camellia (registered trademark) for a block size of 128 bits are currently used. In the code sequence generation process S140 adopting the CTR mode in these block encryption algorithms, the code sequence generation unit 140 can generate spreading code sequences that are highly confidential and has a period of 64 bits×$2^{64}$=$2^{70}$. Alternatively, the code sequence generation unit 140 can generate spreading code sequences that are highly confidential and has a period of 128 bits×$2^{128}$=$2^{135}$.

As mentioned above, in the code sequence generation process S140 according to this embodiment, the code sequence generation unit 140 changes the output of each process element using the sequence parameter KP, thereby allowing generation of the plurality of spreading code sequences using only one type of the block encryption algorithm.

The code sequence output unit 160 receives the spreading code sequence from the code sequence generation unit 140. The code sequence output unit 160 outputs the spreading code sequence via the output interface 940. The spreading code sequence is used for implementing the direct sequence spread spectrum system for spread spectrum in a communication system.

Subsequently, a specific example of the code sequence generation process S140 according to this embodiment will be described.

Figure 4:
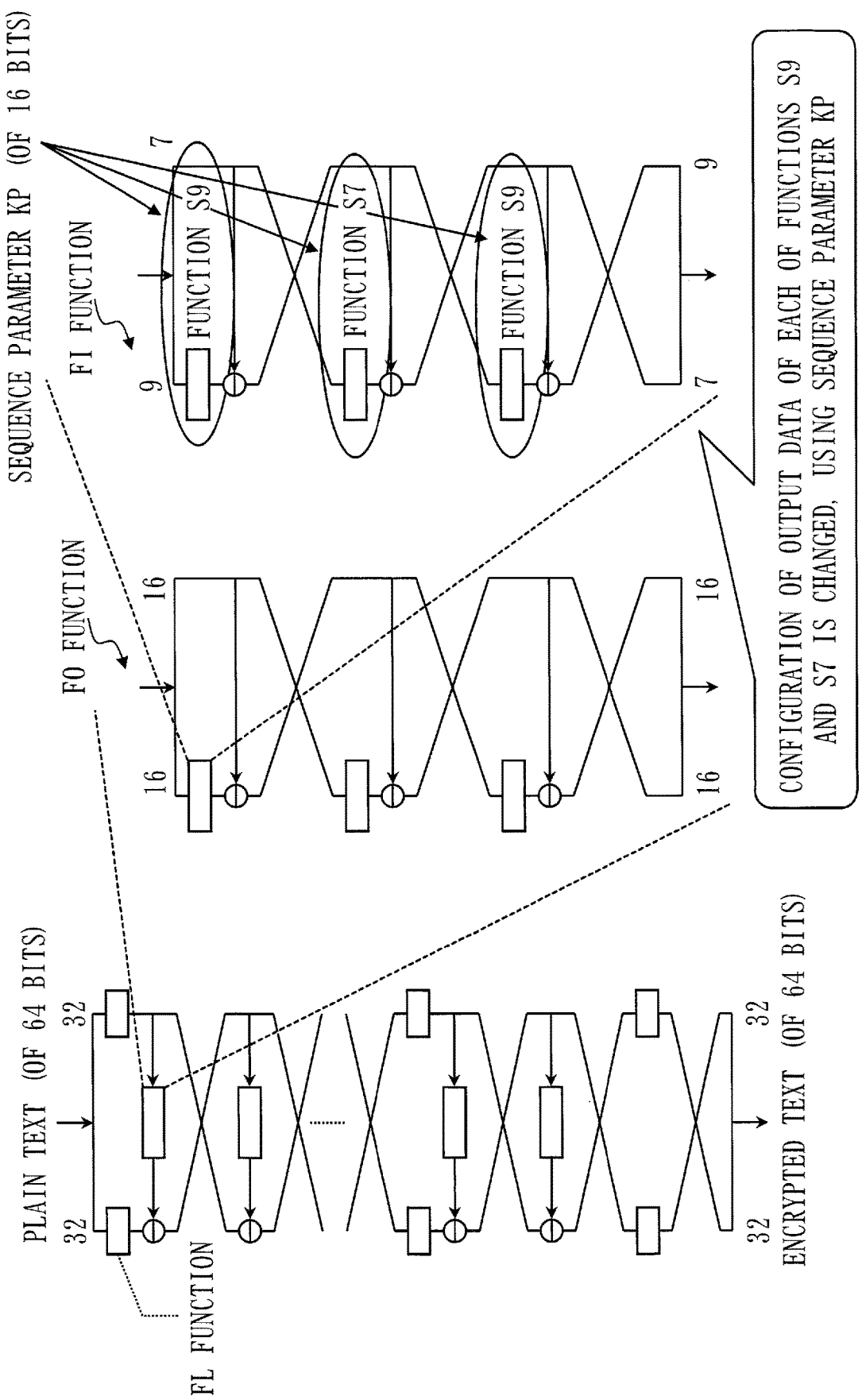
FIG. 4 is a specific configuration diagram when MISTY (registered trademark) is used in a code sequence generation unit 140 according to the first embodiment.

FIG. 4 is a diagram illustrating a specific configuration when MISTY (registered trademark) is used in the code sequence generation process S140 according to this embodiment.

As illustrated in FIG. 4, SBOXes that are the process elements of a function FI in MISTY (registered trademark) are composed of a function S7 having a 7-bit input and a 7-bit output and a function S9 having a 9-bit input and a 9-bit output. The code sequence generation unit 140 operates a total of 16 bits of output data of these functions S7 and S9, using a 16-bit sequence parameter KP, thereby changing an output data configuration.

Figure 5:
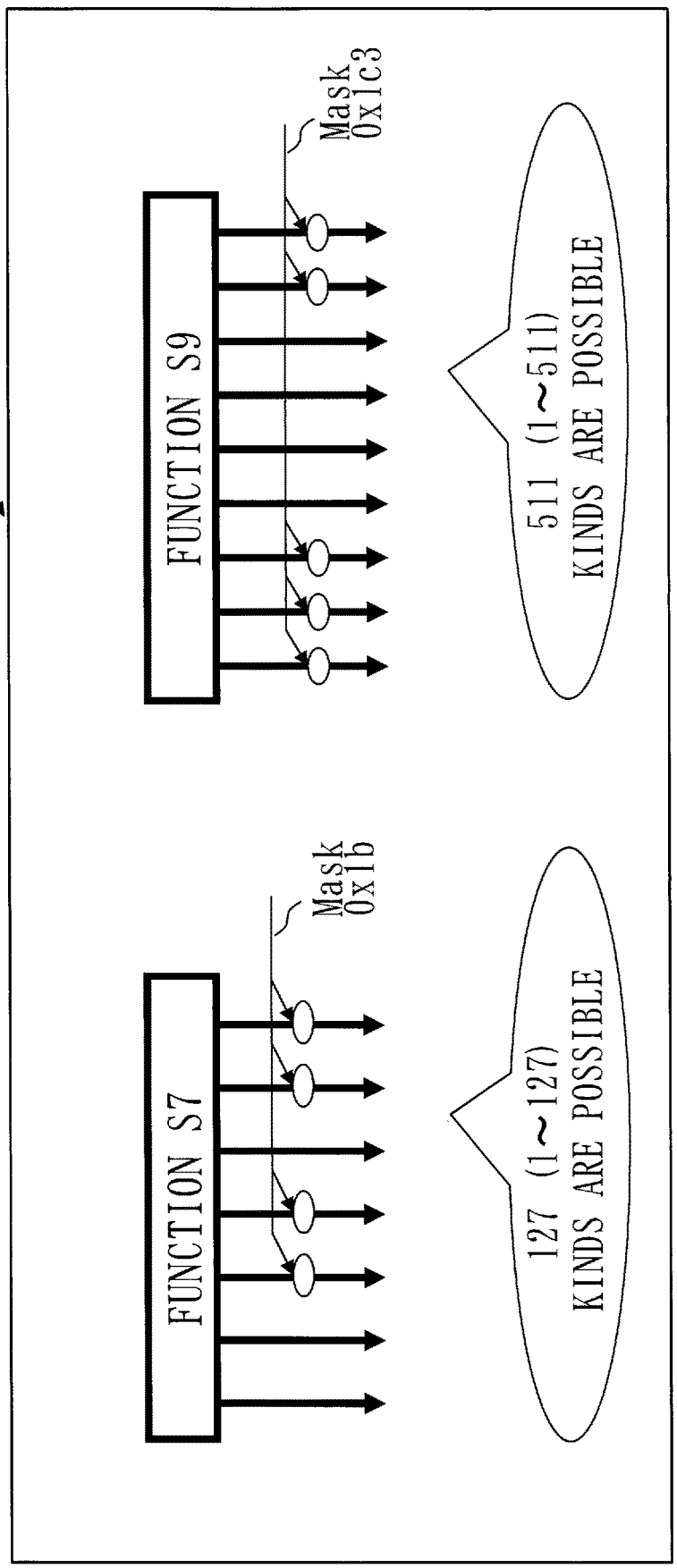
FIG. 5 is a diagram illustrating an SBOX output configuration example 1-1 when MISTY (registered trademark) is used in the code sequence generation unit 140 according to the first embodiment.

FIG. 5 is a diagram illustrating an SBOX output configuration example 1-1 when MISTY (registered trademark) is used in the code sequence generation unit 140 according to this embodiment.

In the SBOX output configuration example 1-1 in FIG. 5, the code sequence generation unit 140 masks output data of each SBOX that is the substitution process by at least a portion of the sequence parameter KP, thereby changing the output data of the SBOX. Specifically, the code sequence generation unit 140 uses information of 7 bits in 16 bits of the sequence parameter KP, as mask information. The mask information formed of the 7 bits in the 16 bits of the sequence parameter KP can be generated in 127 kinds from 1 to 127. FIG. 5 illustrates a case where the mask information of the function S7 in MISTY (registered trademark) is 27 or 0x1b in hexadecimal notation. The code sequence generation unit 140 uses information of 9 bits in the 16 bits of the sequence parameter KP, as mask information. The mask information using the 9 bits in the 16 bits of the sequence parameter KP can be generated in 511 kinds from 1 to 511. FIG. 5 illustrates a case where the mask information of the function S9 in MISTY (registered trademark) is 451 or 0x1c3 in the hexadecimal notation.

As a combination of the bits of the mask information, 0 can be taken. However, in terms of cryptographic security, 0 itself must not be used, so that 0 is excluded from the sequence parameter KP.

In the parameter selection process S130, the parameter selection unit 130 divides the sequence parameter KP that has been received into the information of the 7 bits and the information of the 9 bits, and outputs the information of the 7 bits and the information of the 9 bits that have been obtained by the division, as the output parameter Op. That is, these pieces of the mask information are an example of the output parameter Op that has been selected or generated from the sequence parameter KP.

Even when MISTY (registered trademark) is processed using these pieces of the mask information, processing performance and implementation performance that are substantially equivalent from those in a case where MISTY (registered trademark) is processed without using these pieces of the mask information can be obtained.

Figure 6:
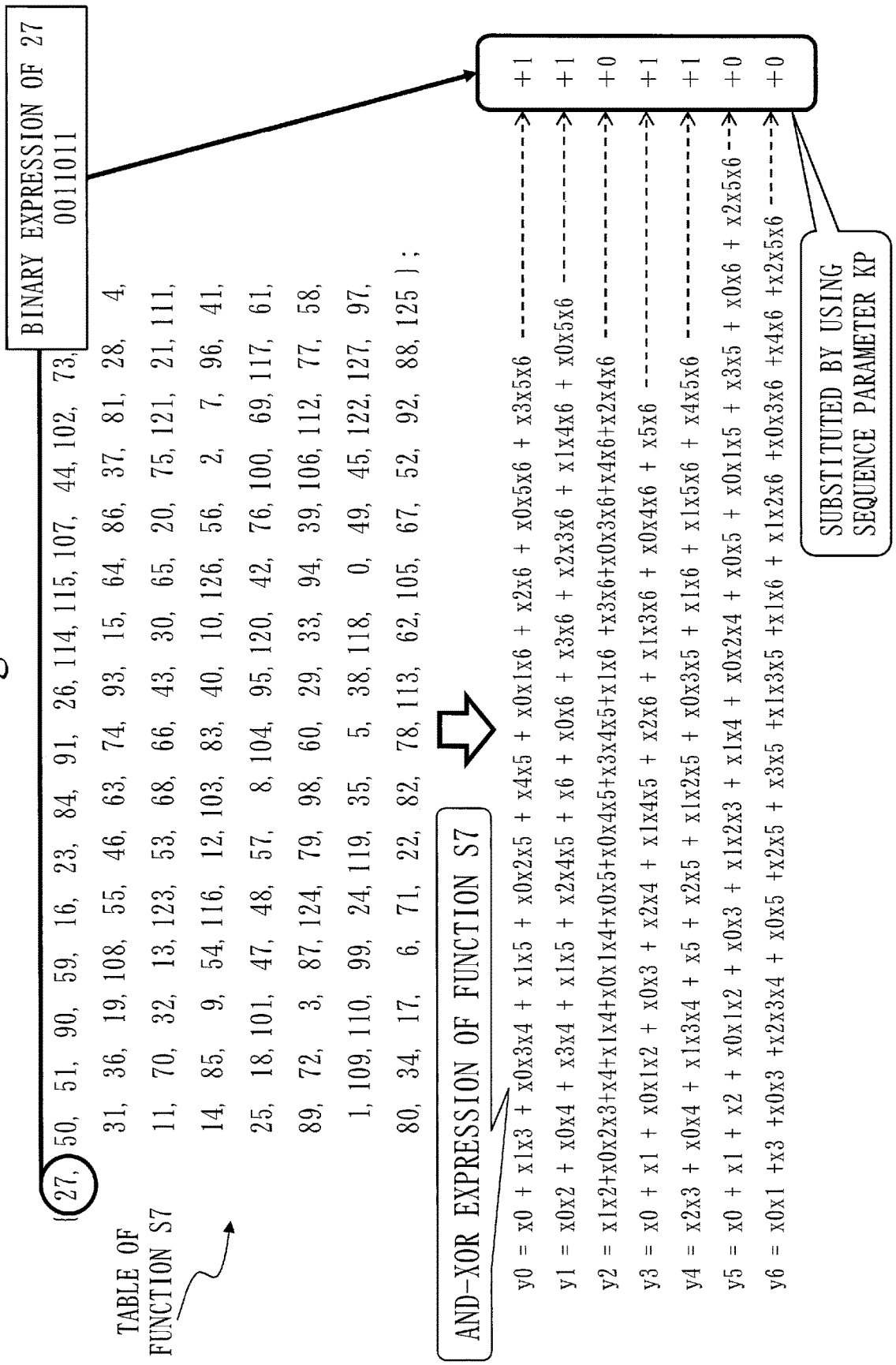
FIG. 6 is a diagram illustrating an SBOX output configuration example 1-2 when MISTY (registered trademark) is used in the code sequence generation unit 140 according to the first embodiment.

FIG. 6 is a diagram illustrating an SBOX output configuration example 1-2 when MISTY (registered trademark) is used in the code sequence generation unit 140 according to this embodiment.

A table of the function S7 in FIG. 6 is a substitution table where the function S7 in MISTY (registered trademark) is expressed in the form of the table. When a code generation function is implemented by hardware implementation, the function S7 is expressed by an AND-XOR expression as illustrated in FIG. 6. In this case, 7 bits from y0 to y6 become output data of the function S7. In the SBOX output configuration example 1-2 in FIG. 6, representations of 0 or 1 in final integer terms of respective expressions of the 7 bits from the y0 to y6 are respectively substituted by the information of the 7 bits in the 16 bits in the sequence parameter KP.

Though FIG. 6 illustrates only the case of the function S7, the function S9 is also expressed by an AND-XOR expression of 9 bits from y0 to y8, like the function S7. In this case, the 9 bits from the y0 to the y8 are output data of the function S9. In the output configuration example 1-2, representations of 0 or 1 in final integer terms of respective expressions of the 9 bits from the y0 to the y8 are respectively substituted by the information of the 9 bits in the 16 bits in the sequence parameter KP.

Figure 7:
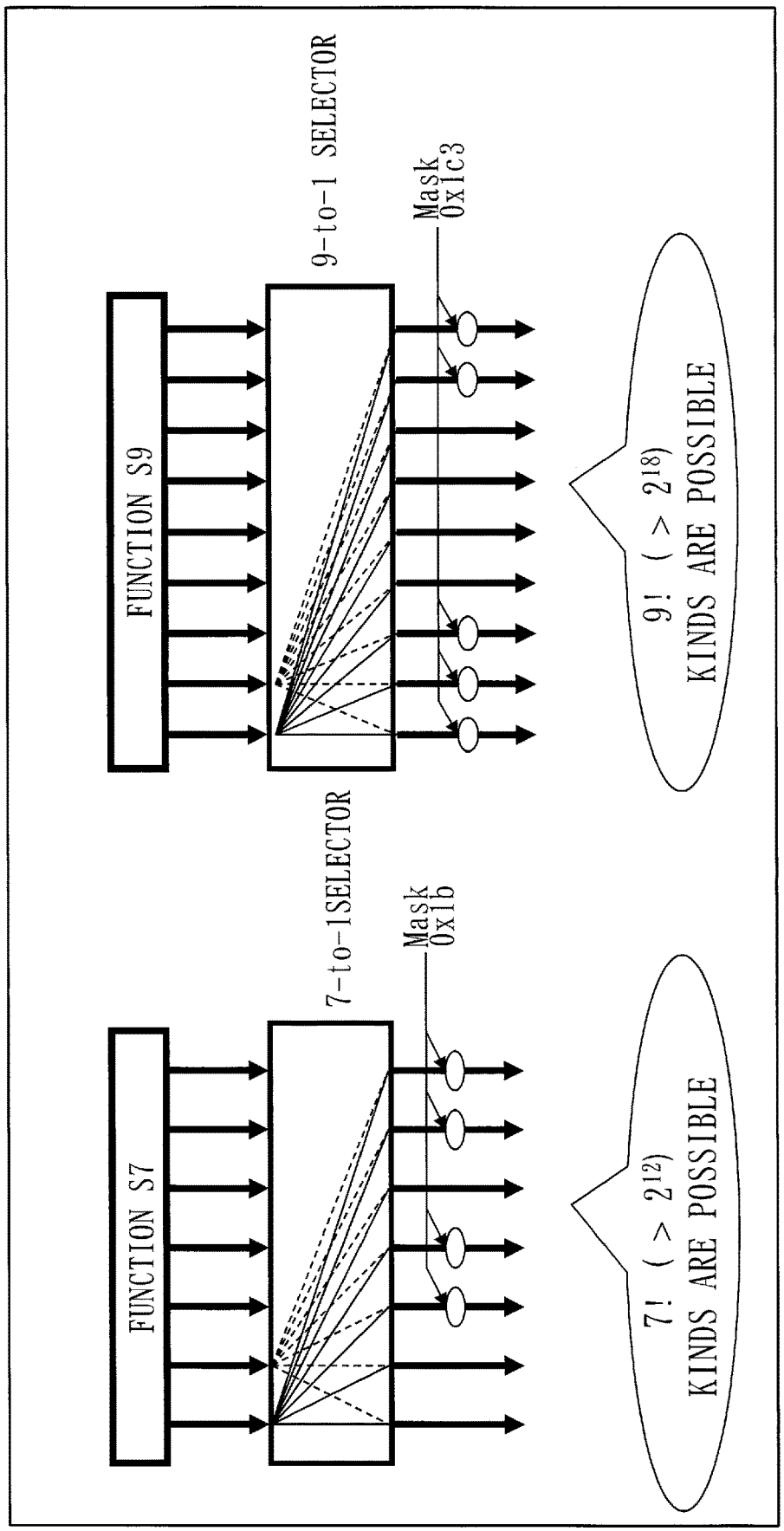
FIG. 7 is a diagram illustrating an SBOX output configuration example 2 when MISTY (registered trademark) is used in the code sequence generation unit 140 according to the first embodiment.

FIG. 7 is a diagram illustrating an SBOX output configuration example 2 when MISTY (registered trademark) is used in the code sequence generation unit 140 according to this embodiment.

In the SBOX output configuration example 2 in FIG. 7, the code sequence generation unit 140 substitutes at least a portion of the sequence parameter KP for output data that is output from each SBOX for each bit, thereby changing the output data. The code sequence generation unit 140 inputs 7 bits of the output data of the function S7 to a 7-to-1 selector, thereby performing the substitution for the output data of the function S7 for each bit. When the code sequence generation unit 140 performs the substitution for the output data of the function S7 for each bit, the code sequence generation unit 140 uses the sequence parameter KP, thereby controlling the substitution. In this case, 7! ($>2^{12}$) kinds of combinations are possible for the output data of the function S7.

Similarly, the code sequence generation unit 140 inputs 9 bits of the output data of the function S9 to a 9-to-1 selector, thereby performing substitution for the output data of the function S9 for each bit. When the code sequence generation unit 140 performs the substitution for the output data of the function S9 for each bit, the code sequence generation unit 140 uses the sequence parameter KP, thereby controlling the substitution. In this case, 9! ($>2^{18}$) kinds of combinations are possible for the output data of the function S9.

Subsequently, a specific implementation configuration for the SBOX output configuration example 2 in FIG. 7 will be described.

Figure 8:
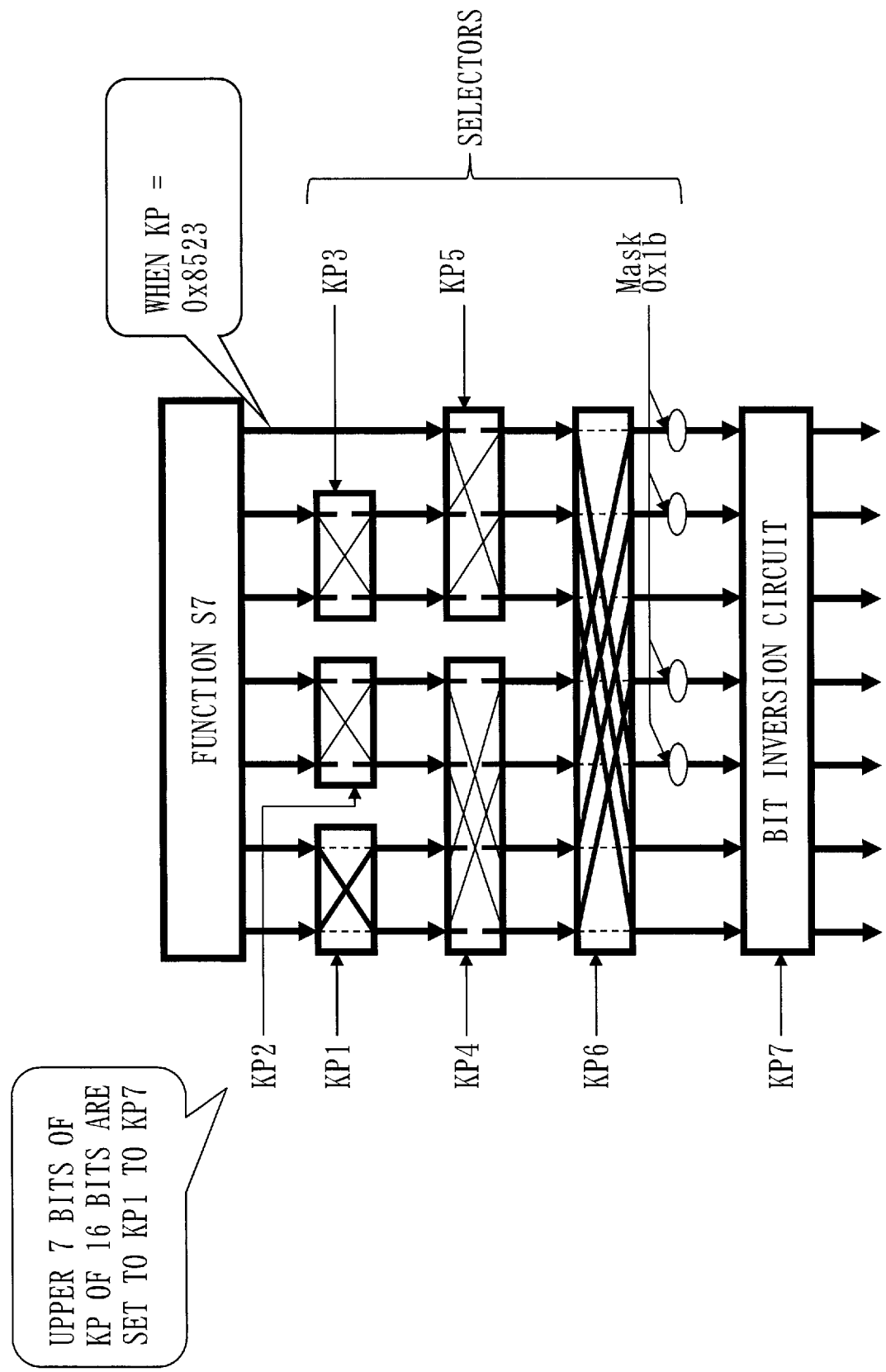
FIG. 8 is a diagram illustrating an output configuration example 2-1 of a function S7 when the output configuration example 2 in FIG. 7 is used in the code sequence generation unit 140 according to the first embodiment.

FIG. 8 is a diagram illustrating a specific implementation configuration 2-1 for the output configuration example 2 of the function S7 in FIG. 7.

The implementation configuration 2-1 in FIG. 8 includes a 2-to-1 selector to select whether each of the upper first bit and the upper second bit of the output data of the function S7 is to be inverted. The selection by this 2-to-1 selector is controlled by the value of KP1 that is the most significant bit of the 16 bits of the sequence parameter KP. Specifically, if the KP1 is 0, the bits are not inverted. If the KP1 is 1, the bits are inverted. Similarly, the implementation configuration 2-1 in FIG. 8 includes a 2-to-1 selector to select whether each of the upper third bit and the upper fourth bit of the output data of the function S7 is to be inverted. The selection by this 2-to-1 selector is controlled by the value of KP2 that is the upper second bit of the 16 bits of the sequence parameter KP. Specifically, if the KP2 is 0, the bits are not inverted. If the KP2 is 1, the bits are inverted. As illustrated in FIG. 8, the implementation configuration 2-1 includes a plurality of selectors, and the selectors are respectively controlled by using values of the KP1, the KP2, and KP3 to KP6. Output data that has been output from a last selector is masked by using upper 7 bits of the 16 bits of the sequence parameter KP and is input to a bit inversion circuit. If KP7 is 0, the bit inversion circuit performs output without inverting the bits. If the KP7 is 1, the bit inversion circuit inverts all the bits. FIG. 8 illustrates a specific example when the 16 bits of the sequence parameter KP is 0x8523 (in the hexadecimal notation).

Figure 9:
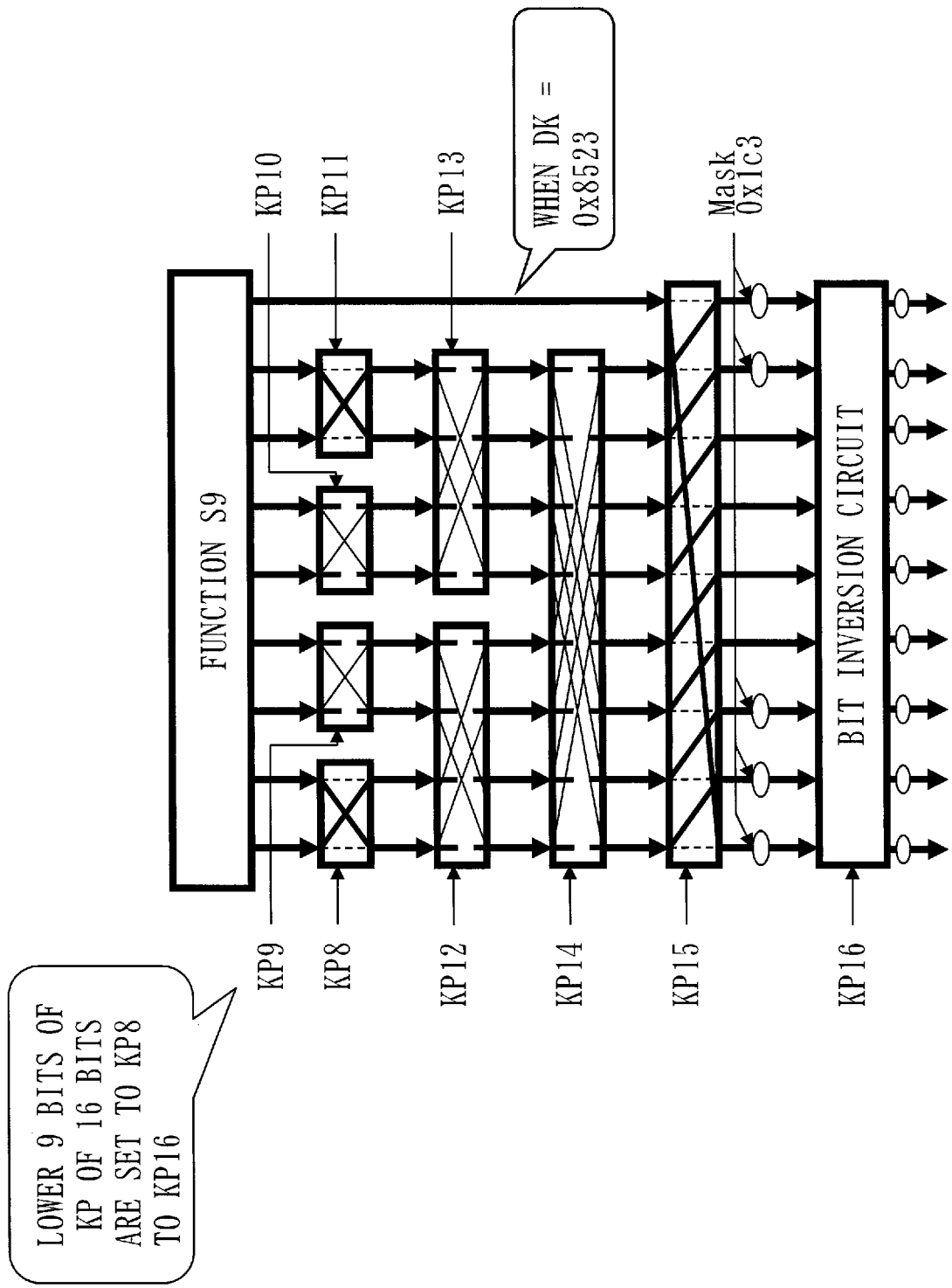
FIG. 9 is a diagram illustrating an output configuration example 2-2 of a function S9 when the output configuration example 2 in FIG. 7 is used in the code sequence generation unit 140 according to the first embodiment.

FIG. 9 is a diagram illustrating a specific implementation configuration 2-2 for the output configuration example 2 of the function S9 in FIG. 7.

The implementation configuration 2-2 in FIG. 9 includes a 2-to-1 selector to select whether each of the upper first bit and the upper second bit of the output data of the function S9 is to be inverted. The selection by this 2-to-1 selector is controlled by the value of KP8 that is the most significant bit of lower 9 bits in the 16 bits of the sequence parameter KP. The most significant bit of the lower 9 bits is the upper eighth bit of the 16 bits of the sequence parameter KP. Specifically, if the KP8 is 0, the bits are not inverted. If the KP8 is 1, the bits are inverted. Similarly, the implementation configuration 2-2 in FIG. 9 includes a 2-to-1 selector to select whether each of the upper third bit and the upper fourth bit of the output data of the function S9 is to be inverted. The selection by this 2-to-1 selector is controlled by the value of KP9 that is the upper ninth bit of the 16 bits of the sequence parameter KP. Specifically, if the KP9 is 0, the bits are not inverted. If the KP9 is 1, the bits are inverted. As illustrated in FIG. 9, the implementation configuration 2-2 includes a plurality of selectors, and the selectors are respectively controlled by using values of the KP8, the KP9, and KP10 to KP15. Output data that has been output from a last selector is masked by using lower 9 bits of the 16 bits of the sequence parameter KP, and is input to a bit inversion circuit. If KP16 is 0, the bit inversion circuit performs output without inverting the bits. If the KP16 is 1, the bit inversion circuit inverts all the bits. FIG. 9 illustrates a specific example when the 16 bits of the sequence parameter KP are 0×8523 (in the hexadecimal notation).

The number of combinations of the output data in the implementation configuration 2-1 in FIG. 8 is substantially the same as that in each case of the output configuration examples 1 and is $2^{16}$ kinds. Processing performance and implementation performance to be implemented by the implementation configuration 2-1 in FIG. 8 are inferior to those in each of the output configuration examples 1. However, bit position substitution is performed in the output data in the implementation example 2-1 in FIG. 8. Thus, as compared with each output configuration example 1, improvement in difficulty of inferring of each spreading code sequence can be expected.

Alternative Configuration

Variation Example 1

As illustrated in FIG. 4, the function FI includes two functions S9 in MISTY (registered trademark). Therefore, it may be so configured that the number of bits of the sequence parameter KP is increased from the 16 bits to 25 bits and an output selection method for each of the output data from a first function S9 and a second function S9 is changed in each of the output configuration example 1-1 in FIG. 5 and the output configuration example 1-2 in FIG. 6. In this case, spreading code sequences of approximately $2^{25}$ kinds that are different and highly confidential can be generated by one code generation apparatus.

Variation Example 2

The SBOX output configuration example 1-1 in FIG. 5 illustrates a result where the code sequence generation unit 140 has masked the outputs of the functions S7 and S9, using the sequence parameter KP that has been divided by the parameter selection unit 130. That is, the parameter selection unit 130 delivers, to the code sequence generation unit 140, the sequence parameter KP that has been divided, without alteration. However, it may be so configured that the parameter selection unit 130 generates new information of the SBOXes that is obtained as a result of masking the outputs of the functions S7 and S9 and delivers to the code sequence generation unit 140 the information of the SBOXes generated.

Variation Example 3

Though the functions of the code generation apparatus 100 are implemented by the software in this embodiment, the functions of the code generation apparatus 100 may be implemented by hardware, as a variation example.

Figure 10:
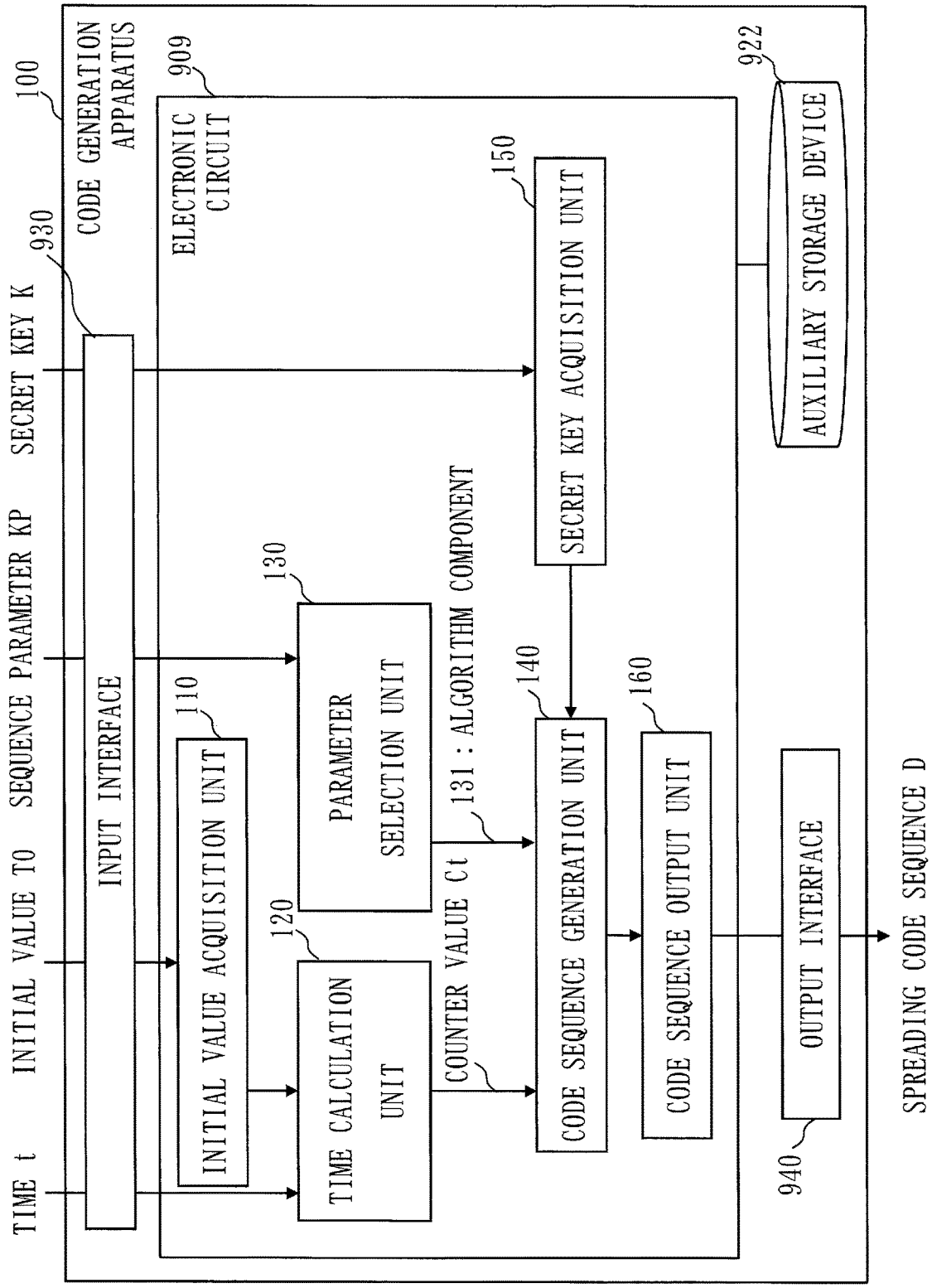
FIG. 10 is a configuration diagram of the code generation apparatus 100 according to a variation example of the first embodiment.

FIG. 10 is a diagram illustrating a configuration of the code generation apparatus 100 according to the variation example of this embodiment.

The code generation apparatus 100 includes an electronic circuit 909, the auxiliary storage device 922, the input interface 930, and the output interface 940.

The electronic circuit 909 is a dedicated electronic circuit to implement the functions of the initial value acquisition unit 110, the time calculation unit 120, the parameter selection unit 130, the code sequence generation unit 140, the secret key acquisition unit 150, and the code sequence output unit 160.

Specifically, the electronic circuit 909 is a single circuit, a composite circuit, a programmed processor, a parallel programed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the components of the code generation apparatus 100 may be implemented by one electronic circuit or may be implemented by being distributed into plural electronic circuits.

As another variation example, a part of the functions of the components of the code generation apparatus 100 may be implemented by the electronic circuit and the remainder of the functions may be implemented by software.

Each of the processor and the electronic circuit is also referred to as processing circuitry. That is, the functions of the initial value acquisition unit 110, the time calculation unit 120, the parameter selection unit 130, the code sequence generation unit 140, the secret key acquisition unit 150, and the code sequence output unit 160 in the code generation apparatus 100 are implemented by the processing circuitry.

Each "unit" of the initial value acquisition unit 110, the time calculation unit 120, the parameter selection unit 130, the code sequence generation unit 140, the secret key acquisition unit 150, and the code sequence output unit 160 in the code generation apparatus 100 may be read as a "step". Further, each "process" of the code generation process, the time calculation process, the parameter selection process, and the code sequence generation process may be read as a "program", a "program product", or a "computer-readable storage medium where the program is recorded".

Description of Effects of this Embodiment

According to the code generation apparatus 100 in this embodiment, security of each spreading code sequence is not reduced because the CTR mode of the block encryption processing that holds the provable security is adopted. Further, according to the code generation apparatus 100 in this embodiment, by changing a part of the configuration of the block encryption processing, the plurality of spreading code sequences that are completely different can be generated. Consequently, the code generation apparatus 100 in this embodiment can make the number of circuits to generate the spreading code sequences smaller than the number of the spreading code sequences that are necessary. Consequently, according to the code generation apparatus 100 in this embodiment, the plurality of spreading code sequences that are highly confidential can be generated while reducing an increase in a circuit size. Further, according to the code generation apparatus 100 in this embodiment, security of the entirety of a communication system that requires a spreading code sequence which is highly confidential can be secured.

According to the code generation apparatus 100 in this embodiment, just by changing the output data of each SBOX of the block encryption algorithm by the sequence parameter, the plurality of spreading code sequences can be generated. Accordingly, the code generation apparatus 100 according to this embodiment just needs to include the block encryption algorithm of one kind. It is particularly effective to apply the code generation apparatus 100 in this embodiment to a satellite-mounted apparatus whose mounting scale is greatly constrained.

Second Embodiment

In this embodiment, a difference from the first embodiment will be described. The same reference numeral is given to the same component as that in the first embodiment, and a description of the same component may be omitted.

Figure 11:
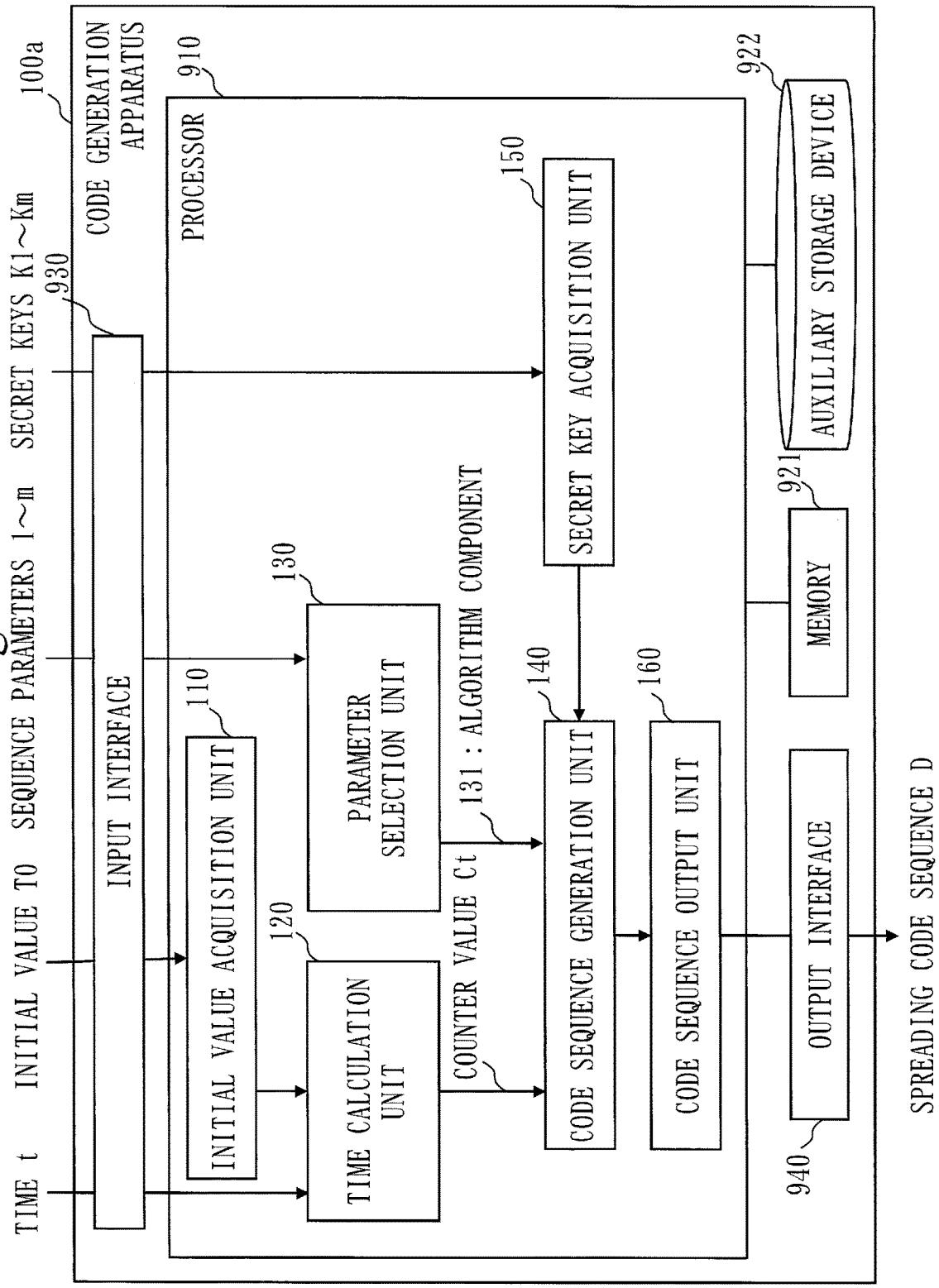
FIG. 11 is a configuration diagram of a code generation apparatus 100*a* according to a second embodiment.
Figure 12:
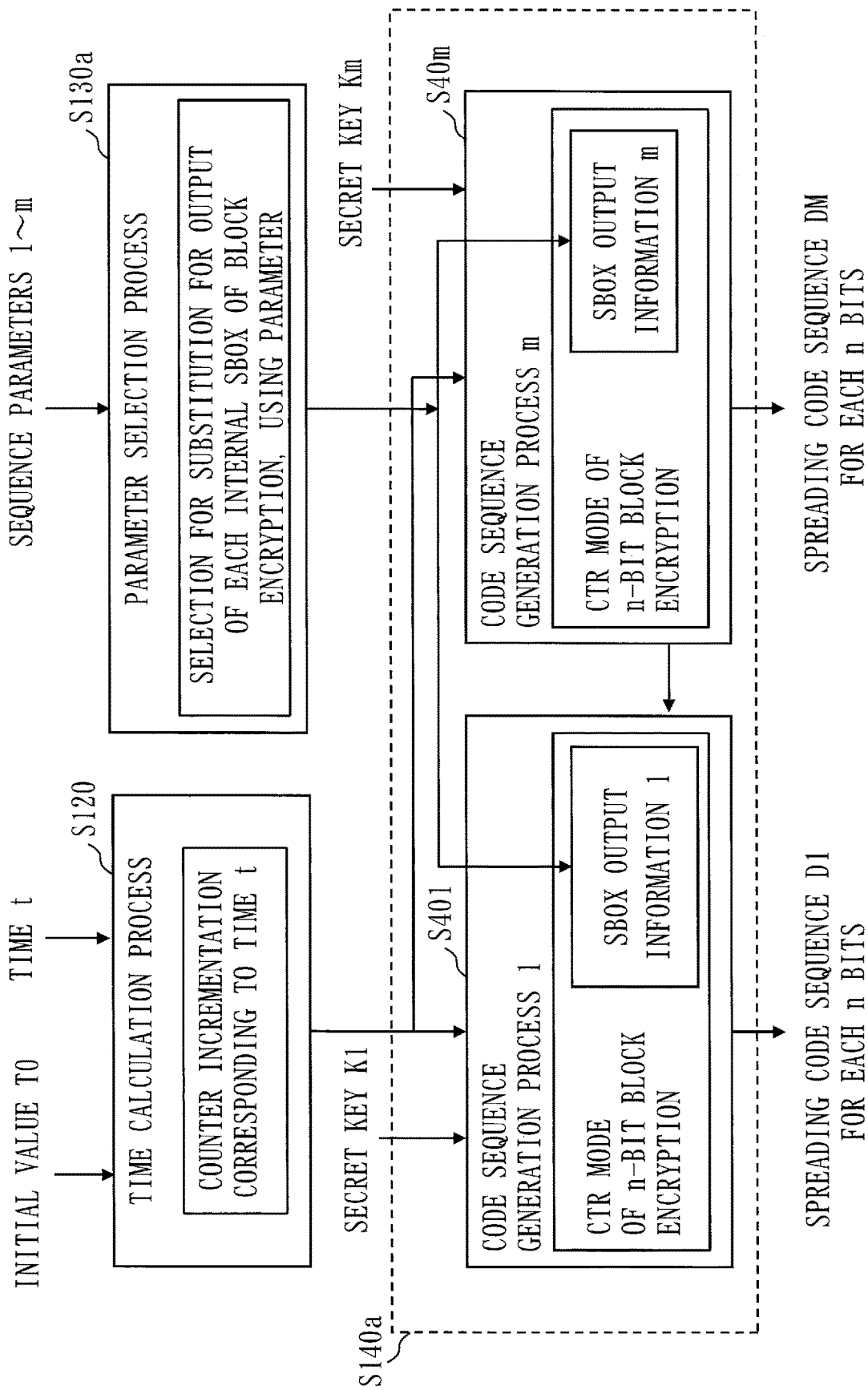
FIG. 12 is a flow diagram illustrating a code generation process S100*a* of the code generation apparatus 100*a* according to the second embodiment.

FIG. 11 is a diagram illustrating a configuration of a code generation apparatus 100a according to this embodiment. FIG. 12 is a diagram illustrating a code generation process S100a according to this embodiment.

The configuration and operations of the code generation apparatus 100a will be described, using FIGS. 11 and 12.

In a parameter selection process S130a, the parameter selection unit 130 acquires a plurality of sequence parameters 1 to m. The plurality of sequence parameters 1 to m uniquely and respectively identifies a plurality of spreading code sequences.

The secret key acquisition unit 150 acquires a plurality of secret keys K1 to Km.

The code sequence generation unit 140 includes a plurality of code sequence generation units 401 to 40m to execute a plurality of code sequence generation processes S401 to S40m. The parameter selection unit 130 respectively outputs the plurality of sequence parameters 1 to m to the plurality of code sequence generation units 401 to 40m. The secret key acquisition unit 150 respectively outputs the plurality of secret keys K1 to Km to the plurality of code sequence generation units 401 to 40m.

In a code sequence generation process S140a, each of the plurality of code sequence generation units 401 to 40m generates the spreading code sequence. As mentioned above, the code generation apparatus 100a generates spreading code sequences D1 to Dm of m kinds, which are highly confidential.

A specific effect of the code generation apparatus 100a according to this embodiment will be described, using FIG. 13.

Figure 13:
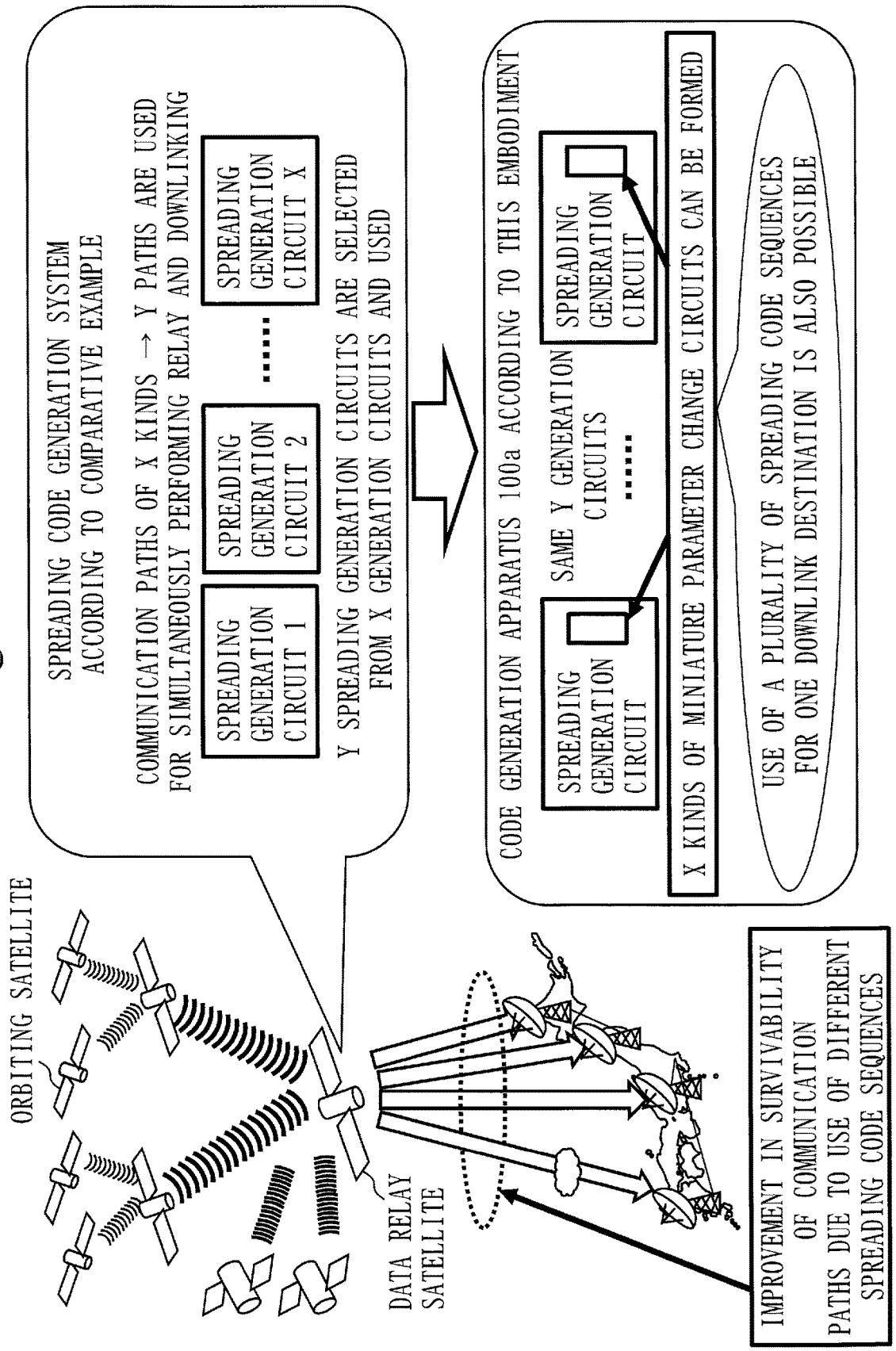
FIG. 13 is a diagram illustrating an example of an effect of the code generation apparatus 100*a* according to the second embodiment.

A case where a plurality of orbiting satellites perform communications with a plurality of ground stations via one data relay satellite, as illustrated in FIG. 13 is assumed. It is assumed that the data relay satellite uses spreading code sequences that are highly confidential and mutually differ in respective communication paths of X kinds. It is also assumed that Y paths are used for relaying and downlinking to be simultaneously performed. In this case, X spreading generation circuits corresponding to the communication paths have been necessary in the spreading code generation system of the comparative example in FIG. 3. Then, in the spreading code generation system of the comparative example, Y spreading generation circuits used for the relaying and the downlinking to be simultaneously performed have been selected from the X spreading generation circuits, thereby generating Y spreading code sequences.

On the other hand, in the code generation process S100a according to this embodiment, Y spreading generation circuits should be mounted if the number of the paths used for the relaying and the downlinking to be simultaneously performed is Y. Then, by inputting sequence parameters of the X kinds to each spreading generation circuit, the simultaneous relaying and downlinking can be accommodated in the code generation process S100a. Generally, the number of paths used for relaying and downlinking to be simultaneously performed is overwhelmingly smaller than the number of combinations of communication paths. Therefore, application of the code generation apparatus 100a according to this embodiment to a satellite-mounted apparatus whose mounting scale is greatly constrained is particularly effective.

In each of the first and second embodiments, the description has been given, assuming that each unit of the code generation apparatus is an independent functional block. The configuration of the code generation apparatus does not have to be the configuration as in each of the above-mentioned embodiments. Functional blocks of the code generation apparatus may be arbitrarily configured if they can implement the functions described in each of the above-mentioned embodiments.

A plurality of portions of the first and second embodiments may be carried out in combination. Alternatively, a portion of these embodiments may be carried out. Alternatively, a whole or a part of these embodiments may be carried out in any combination.

The above-mentioned embodiments are essentially preferable illustrations, and do not intend to limit the range of the present invention, the application range of the present invention, and the use range of the present invention. Various modifications of the above-mentioned embodiments are possible as necessary.

REFERENCE SIGNS LIST 100, 100a: code generation apparatus; 110: initial value acquisition unit; 120: time calculation unit; 130: parameter selection unit; 131: algorithm component; 140: code sequence generation unit; 150: secret key acquisition unit; 160: code sequence output unit; 909: electronic circuit; 910: processor; 921: memory; 922: auxiliary storage device; 930: input interface; 940: output interface.

The invention claimed is:
1. A code generation apparatus to generate a plurality of spreading code sequences using block encryption processing to output a plurality of blocks as a spreading code sequence, the block encryption processing including process elements each to receive input data and to output output data, the code generation apparatus comprising:
  a processor; and
  a memory storing instructions which, when executed, causes the processor to select a sequence parameter uniquely corresponding to each spreading code sequence of the plurality of spreading code sequences,
to acquire a secret key, and
to generate each spreading code sequence of the plurality of spreading code sequences by execution of the block encryption processing, which generates different n-bit random data sequences as the respective spreading code sequences using the sequence parameter and the secret key, the processor changing the output data that is output from each of the process elements, using the sequence parameter, when the processor generates each spreading code sequence.

2. The code generation apparatus according to claim 1, wherein the instructions, when executed, cause the processor to
generate each spreading code sequence of the plurality of spreading code sequences by execution of the block encryption processing in the CTR (Counter) mode,
count up a counter value used in the CTR mode, and output the counter value for each threshold time.

3. The code generation apparatus according to claim 2, wherein the instructions, when executed, cause the processor to
select a plurality of sequence parameters respectively and uniquely, corresponding to the plurality of spreading code sequences, and
output the plurality of sequence parameters in order to generate the plurality of spreading code sequences.

4. The code generation apparatus according to claim 1, wherein the block encryption processing includes, as each of the process elements, a substitution process of performing substitution for the input data, for each bit, based on a substitution table, and
wherein the instructions, when executed, causes the processor to perform an operation on the output data that is output by the substitution process and at least a part of the sequence parameter, for each bit, in order to change the output data.

5. The code generation apparatus according to claim 4, wherein the instructions, when executed, cause the processor to
select a plurality of sequence parameters respectively and uniquely, corresponding to the plurality of spreading code sequences, and
output the plurality of sequence parameters in order to generate the plurality of spreading code sequences.

6. The code generation apparatus according to claim 1, wherein the block encryption processing includes, as each of the process elements, a substitution process of performing substitution for the input data, for each bit, based on a substitution table, and
wherein the instructions, when executed, causes the processor to substitute at least a part of the sequence parameter for the output data that is output by the substitution process, for each bit, in order to change the output data.

7. The code generation apparatus according to claim 6, wherein the instructions, when executed, cause the processor to
select a plurality of sequence parameters respectively and uniquely corresponding to the plurality of spreading code sequences, and
output the plurality of sequence parameters, thereby generating the plurality of spreading code sequences.

8. The code generation apparatus according to claim 1, wherein the instructions, when executed, cause the processor to
select a plurality of sequence parameters respectively and uniquely corresponding to the plurality of spreading code sequences, and
output the plurality of sequence parameters in order to generate the plurality of spreading code sequences.

9. A code generation method of generating a plurality of spreading code sequences using block encryption processing to output a plurality of blocks as a spreading code sequence, the block encryption processing including process elements each to receive input data and output output data, the code generation method comprising:
selecting, by a processor, a sequence parameter uniquely corresponding to each spreading code sequence of the plurality of spreading code sequences;
acquiring, by the processor a secret key;
generating, by the processor, each spreading code sequence of the plurality of spreading code sequences by execution of the block encryption processing, which generates a different n-bit random data sequence as each spreading code sequence using the sequence parameter and the secret key; and
changing, by the processor, the output data that is output from each of the process elements, using the sequence parameter, when each spreading code sequence is to be generated.

10. A non-transitory computer readable medium storing a code generation program of generating a plurality of spreading code sequences using block encryption processing to output a plurality of blocks as a spreading code sequence, the block encryption processing including process elements each to receive input data and output output data, the code generation program causing a code generation apparatus that is a computer to execute:
a parameter selection process of selecting a sequence parameter uniquely corresponding to each spreading code sequence of the plurality of spreading code sequences;
a secret key acquisition process of acquiring a secret key; and
a code sequence generation process of generating each spreading code sequence of the plurality of spreading code sequences by execution of the block encryption processing which generates different n-bit random data sequences as the respective spreading code sequences using the sequence parameter and the secret key, and changing the output data that is output from each of the process elements, using the sequence parameter, when the code generation apparatus generates each spreading code sequence.

* * * * *